UNITED STATES PATENT OFFICE.

WILLIAM POWELL, OF LONDON, ENGLAND, ASSIGNOR TO POWELL WOOD PROCESS (NORTH AMERICA) INCORPORATED, OF NEW YORK, N. Y.

PROCESS FOR TREATING WOOD.

1,297,491. Specification of Letters Patent. Patented Mar. 18, 1919.

No Drawing. Application filed June 17, 1916. Serial No. 104,316.

*To all whom it may concern:*

Be it known that I, WILLIAM POWELL, a subject of the King of England, residing at London, England, have invented new and useful Improvements in Processes for Treating Wood, of which the following is a specification.

This invention relates to the treament of timber and has particular reference to processes in which timber is seasoned and toughened by impregnating the fibers with a saccharine solution to which a solution is sometimes added.

Instead of employing merely a saccharine solution, with or without an insecticide, a solution may also be employed which also contains one or more other carbohydrates such as starch, dextrin or gum. Such a solution is hereinafter referred to as a "mixed" carbohydrate solution.

By treatment with this mixed corbohydrate solution the fibers of the wood are thickened and strengthened to lessen the size of the pores in the wood, imparting greater tenacity to the fibers and generally increasing the valuable qualities of the timber. The addition of the starchy carbohydrates has the effect of making the treated wood less hygroscopic and consequently less susceptible to the influence of dampness or moisture in the atmosphere. Further, the density of the wood and its strength and elasticity are increased.

In timber treated according to this invention the greater portion of the sap is expelled and the remainder coagulated or solidified. The sap is expelled by gradually heating and then boiling the wood in a saccharine solution. The wood is thus sterilized and rendered proof against injury by fungoid growths and further its tendency to split or crack at high temperatures is lessened and the wood is in effect rapidly seasoned so that freshly cut timber may, after treatment, be worked practically at once.

The timber may be made impervious to the attacks of white ants or other wood-destroying insects by the addition of 2% to 4% of arsenic to the solution. The arsenic permeates the wood fibers through the action of the solution and enters into combination with the cellulose matter of the wood.

The proportions of the various constituents of the solution may vary but the following solution is given as an example, as suitable for use say, with newly felled oak or walnut wood.

In carrying out the process to an aqueous saccharine solution having a specific gravity of about 1080° is added 5% of dextrin, $\frac{1}{2}$% of gum tragacanth and 3% of arsenic. The specific gravity of the saccharine solution is determined by the ordinary heavy standard specific gravity hydrometer used in Great Britain, which is scaled from 1000° to 2000° and which registers the specific gravity of pure water as 1000° at a temperature of 60° Fahrenheit. These ingredients may be incorporated in the solution in any convenient way and if desired solutions of the separate constituents may be made and added to the saccharine solution.

The process of treating the timber is preferably as follows: The timber to be treated is immersed in the mixed carbohydrate solution, with or without the arsenic, at a temperature between 120° and 140° Fahrenheit and is allowed to remain until the timber becomes thoroughly heated throughout and parts with a considerable amount of air before the temperature is further raised. The air escapes when it is expanded by heat and comes away naturally to the warm solution in the form of air bubbles, as will be understood. When soft woods are to be treated the initial temperature is preferably somewhat higher than in the case of hard woods. When sufficient air has been driven off from the timber the temperature of the liquor is raised to boiling point and maintained at approximately that temperature until the wood is sufficiently cooked. The liquor is then cooled artificially or naturally to a temperature between 180° and 110° Fahrenheit, the actual temperature depending upon the wood and the purposes for which it is subsequently to be used. Finally the wood is allowed to dry by exposure in the open air or is artificially dried. If allowed to dry in the open air the timber treated by this process is ready for use in about one-tenth of the time required for the seasoning of untreated timber and in less time than when treated with a saccharine solution only. When artificially dried the wood may be immediately removed from the solution to drying kilns or chambers where it is subjected to moist air at approximately the same temperature as the timber, this air containing initially, say from 80% to the saturation point of moisture. The temperature of the drying kiln or chamber is gradually raised maintaining the moisture point at its initial value until the wood is thoroughly heated to the maximum temperature required which may vary from 100° to 220° Fahrenheit, according to the nature and size of the timber. After the wood has remained a sufficient length of time at the maximum temperature both the temperature and moisture are gradually reduced, the temperature to say 70° Fahrenheit and the degree of moisture in the air to say 70% of relative humidity at that temperature. The wood is allowed to remain in the kiln or chamber until it has given up the greater part of its moisture.

It will be understood that the length of time required for the various stages of the process and, to some extent, the temperatures employed, will depend upon the nature and condition of the timber under treatment and also upon the purpose for which the timber is to be employed.

Having thus fully described my invention what I claim as new and desire to secure by Letters Patent is:

1. The herein described process for the treatment of timber which consists in impregnating it with a solution containing sugar and dextrin.

2. The herein described process for the treatment of timber which consists in impregnating it with a solution containing sugar, dextrin and gum.

3. The herein described process for the treatment of timber which consists in impregnating it with a solution containing sugar, starch, dextrin and gum.

4. The herein described process for the treatment of timber which consists in impregnating it with a solution containing sugar, dextrin and gum tragacanth.

5. The herein described process for the treatment of timber which consists in impregnating it with a solution containing sugar, dextrin, gum tragacanth and arsenic.

6. The herein described process for the treatment of timber which consists in impregnating it with a solution containing sugar, dextrin and gum tragacanth in the proportions specified.

7. The herein described process for the treatment of timber consisting in immersing it in a solution containing sugar, dextrin and gum at a temperature of between 120° and 140° Fahrenheit, raising the temperature to the boiling point, allowing the liquid and immersed wood to cool to a temperature of between 180° and 110° Fahrenheit and then removing and drying the wood substantially as set forth.

8. The herein described process for the treatment of timber consisting in immersing it in a solution containing sugar, dextrin and gum at a temperature of between 120° and 140° Fahrenheit, raising the temperature to the boiling point, allowing the liquid and immersed wood to cool to a temperature of between 180° and 110° Fahrenheit, submitting the wood to the action of moist air in a drying chamber, gradually raising the temperature of the chamber to between 100° and 220° Fahrenheit and then allowing the chamber to cool gradually.

9. The herein described process for the treatment of timber consisting in immersing the timber in a sugary solution having a specified specific gravity, together with 5% of dextrin, ½% of gum tragacanth and 3% of arsenic.

In testimony whereof I have signed my name to this specification in the presence of two subscribing witnesses.

WILLIAM POWELL.

Witnesses:
John Arthur Green,
Grace Edith Carter.